No. 813,857. PATENTED FEB. 27, 1906.
C. W. CARTER.
MACHINE FOR ICING CAKE AND OTHER PASTRY.
APPLICATION FILED MAY 14, 1904.

3 SHEETS—SHEET 1.

Witnesses.
E. W. Jeppson.
R. C. Mabry.

Inventor.
Clarence W. Carter.
By his attorneys
Williamson & Merchant

No. 813,857. PATENTED FEB. 27, 1906.
C. W. CARTER.
MACHINE FOR ICING CAKE AND OTHER PASTRY.
APPLICATION FILED MAY 14, 1904.

3 SHEETS—SHEET 2.

Witnesses
E. W. Jeppesen.
R. C. Mabry.

Inventor.
Clarence W. Carter.
By his Attorneys.
Williamson & Merchant

No. 813,857. PATENTED FEB. 27, 1906.
C. W. CARTER.
MACHINE FOR ICING CAKE AND OTHER PASTRY.
APPLICATION FILED MAY 14, 1904.

3 SHEETS—SHEET 3.

Witnesses.
E. W. Jeppesen.
R. C. Matry

Inventor:
Clarence W. Carter,
By his Attorneys.
Williamson & Merchant

UNITED STATES PATENT OFFICE.

CLARENCE W. CARTER, OF MINNEAPOLIS, MINNESOTA.

MACHINE FOR ICING CAKE AND OTHER PASTRY.

No. 813,857.     Specification of Letters Patent.     Patented Feb. 27, 1906.

Application filed May 14, 1904. Serial No. 207,910.

*To all whom it may concern:*

Be it known that I, CLARENCE W. CARTER, a citizen of the United States, residing at Minneapolis, in the county of Hennepin and State of Minnesota, have invented certain new and useful Improvements in Machines for Icing Cakes and other Pastries; and I do hereby declare the following to be a full, clear, and exact description of the invention, such as will enable others skilled in the art to which it appertains to make and use the same.

My invention relates to machines for molding icing or other semiplastic material on cakes or other pastries, and has for its object to provide an improved machine of this class.

To this end my invention consists of the novel devices and combination of devices hereinafter described, and defined in the claims.

The invention is illustrated in the accompanying drawings, wherein like notations refer to like parts throughout the several views.

Figure 1:
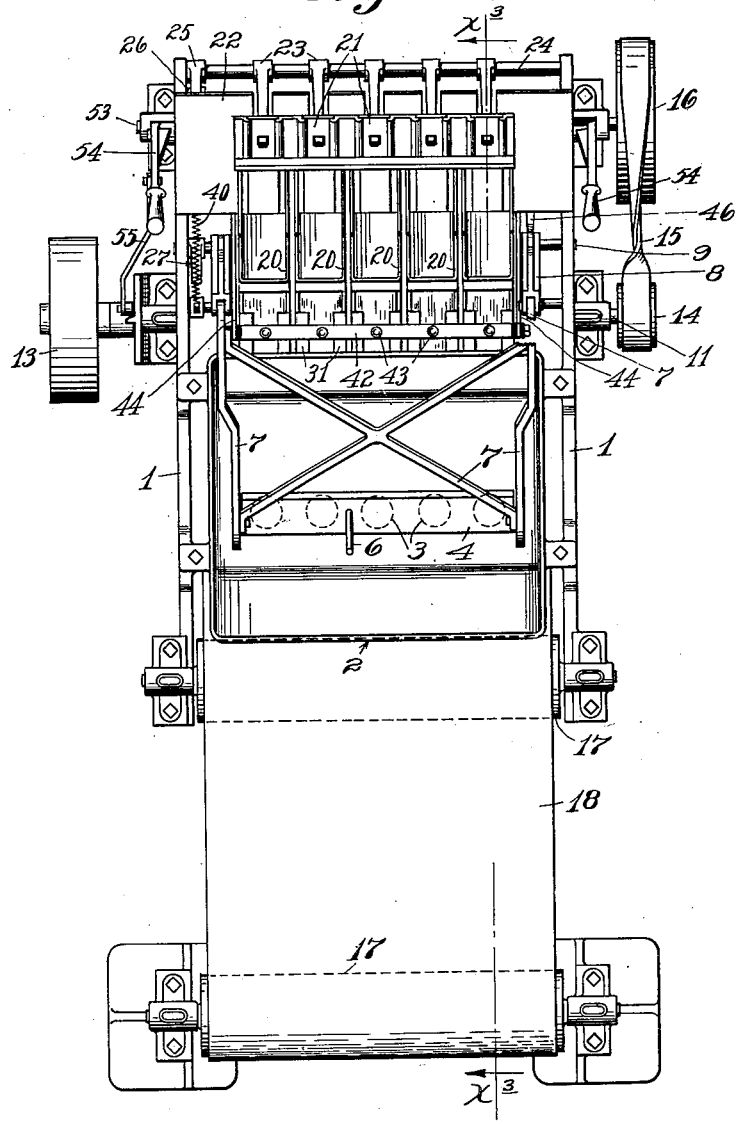
Figure 2:
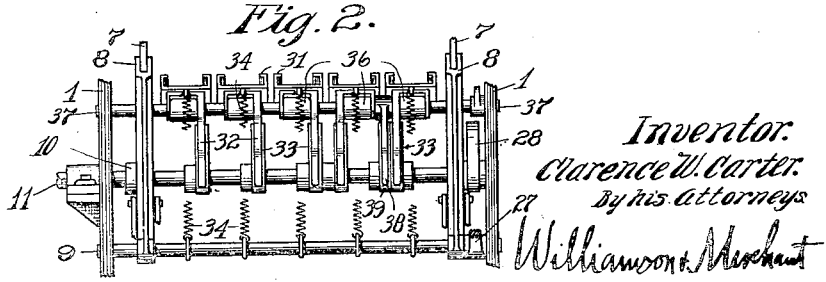
Figure 3:
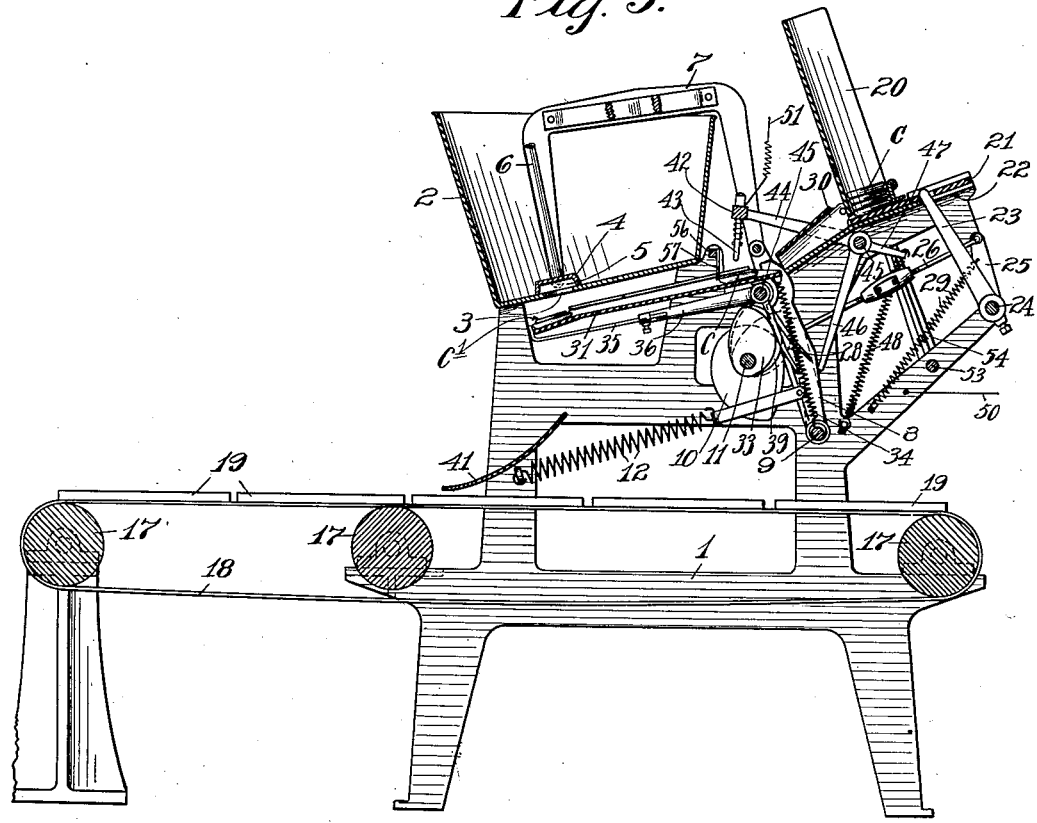
Figure 4:
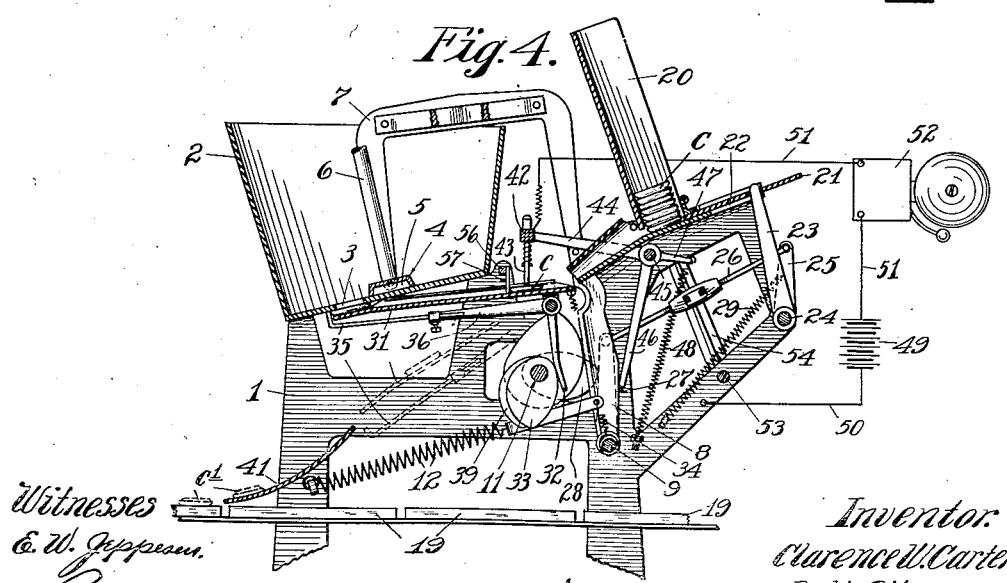

In said drawings, Figure 1 is a plan view of my improved machine. Fig. 2 is a view in front end elevation with some parts removed and others broken away. Fig. 3 is a vertical longitudinal section through the entire machine on the line $x^3$ $x^3$ of Fig. 1 with some parts broken away. Fig. 4 is a view in section on the same plane as Fig. 3 with some parts broken away, illustrating the same parts as in Fig. 3, but showing some thereof in a different position and also having some additional parts shown in diagram. Figs. 5 to 9, inclusive, are diagram views illustrating four successive positions taken by the coöperative parts, which supply the cakes to the dies and deliver the finished products therefrom.

The numeral 1 represents a suitable frame adapted to support the working parts of the machine.

The numeral 2 represents a stationary stock-hopper the bottom of which is provided with a series of die-openings 3 and serves as the mold or die plate of the machine.

The numeral 4 represents a cut-off valve mounted to move over the mold or die plate within the hopper for admitting the stock to the dies 3 at the proper time and cutting off the supply thereto during the time that the cakes are being removed from the dies and delivered from the machine. The said cut-off valve 4 is recessed on its under side or face to afford an air-chamber 5, which spans the dies when the cut-off valve is in its die-closing position, as shown in Fig. 3. The valve 4 carries or has applied thereto a small tube 6, opening below into the air-chamber 5, for supplying air under pressure to the said chamber to force the molded material out from the dies. The said pipe 6 would be in communication in practice with a receiver or other source of supply of air under pressure.

The cut-off valve 4 is pivotally connected to the inner arms of a yoke 7, which spans the forward wall of the hopper 2, and has its outer arms pivotally attached to a pair of crank-arms 8 on a shaft 9, one or both of which are subject to a cam or cams 10 on cam-shaft 11 and to opposing springs 12, connected to the said arms 8 and anchored to the frame of the machine, as clearly shown in Figs. 3 and 4. Under the coöperation of said cam or cams 10 and spring or springs 12 the cut-off valve 4 receives intermittently reciprocating motions in reverse directions, as required for the proper action of the said valve. Said cam-shaft 11 is provided at one end with a pulley 13 for the application of power from any suitable source and at its opposite end with a small pulley 14, connected by belt 15 with pulley 16 on the projecting trunnion of one member of a set of rollers 17, on which is mounted an endless conveyer 18, supporting receiving-trays 19, into which the finished products are delivered, as will presently more fully appear.

The numeral 20 represents a series of supply-magazines for holding the cakes or other pastries c, with the bottom member thereof subject to a feed-slide 21, mounted for reciprocating motion on a fixed guide-deck 22 and subject to a crank-arm 23, fixed to rock-shaft 24, suitably journaled in the forward side brackets of the main frame 1, as clearly shown in Figs. 3 and 4. The rock-shaft 24 has fixed thereto a crank-arm 25, connected by turnbuckle-rod 26 with a lever 27, loosely mounted on the shaft 9 and subject to cam 28 on the cam-shaft 11, and a suitable opposing spring 29, shown as applied to the crank 25 of the shaft 24 and anchored to the main frame 1. There are as many magazines 20, with corresponding feed-slides 21 and operating-arms 23, as there are die-openings in the mold or die plate forming the bottom of the stock-hopper 2.

The cake forced out from the magazine 20 by the feed-slide 21 is delivered through an inclined trough 30 to the upper end of a pivoted chute 31, having a depending arm 32 subject to a cam 33 on the cam-shaft 11 and to opposing spring 34, shown as connected to the rear upper end of the pivoted chute 31 and anchored below to the shaft 9. The pivoted chute 31 is of such length as to underreach the coöperating die 3 of the mold-plate, and at the die-spanning portion thereof the side walls of the chute are reduced, leaving an extended portion of the floor of the chute with low side walls at its outer end and which extended portion is shown as dipping downward at a slight angle to the main or body portion of the chute. There are as many pivoted chutes 31 as there are dies 3 in the mold-plate, and all these chutes 31 are independently and adjustably pivoted and subject to independent cams 33 and opposing springs 34 for permitting any desired independent adjustment thereof for the best adaptation to the functions required therefrom.

Sets of guard-figures 35 are adjustably secured to and carried by lever-arms 36, which are all fixed to a common rock-shaft 37, suitably journaled in the main frame or otherwise and provided with one or more depending arms 38, subject to corresponding cams 39 on the cam-shaft 11 and to corresponding opposing springs 40, connected to said arms 38 at one end and anchored at the other to the frame or other fixed base of resistance. The sets of fingers 35 have upturned tips at their outer ends which embrace the outer end of the coöperating pivoted chute 31 and rise to a point above the delivery end of the chute for coöperation therewith to catch and hold the cake and center the same under the die in proper position to receive the molding material, as will be rendered more distinct in tracing the general operation of the machine. The fingers 35 and their carrying-arms 36 constitute guard levers or devices which coöperate with the pivoted chutes 31 to receive the cakes c from the force-feed devices to supply the same one at a time to the coöperating dies, to hold the cake in its die-centered position until the material is molded thereon and to deliver the finished product to the receiving-trays 19 or other suitable receptacle.

A concave guide-deck 41 is shown as suitably supported by the main frame above the endless carrier 18 in position to receive the frosted cakes from the coöperating chutes and guard-levers and to direct the same into the trays 19 on the face of the carrier.

In an insulated cross bar or head 42 (shown in Figs. 1, 3, and 4) are mounted a series of spring-seated metallic feeler-like contacts 43. The insulated bar 42 is carried by crank-arms 44, fixed to a rock-shaft 45, journaled in the main frame and provided with a pair of depending arms 46, which bear against and are subject to the arms 8 on the shaft 9, through which motion is imparted to the yoke 7 and the cut-off valve 4. The said rock-shaft 45 is also provided with projecting crank-arms 47, to which are attached the upper ends of springs 48, which have their lower ends anchored to the main frame 1 and hold the arms 46 of the rock-shaft 45 always in contact with the faces of the lever-arms 8, which therefore serve as cams coöperating with the springs 48 to give the required rocking motion to the shaft 45 and the contact-carrying bar 42.

From a battery 49 or other source of electric current a conductor 50 extends to the main frame 1, through which and the working parts current can reach the pivoted chutes 31. The insulated feeler-head 42 is connected by conductor 51 with the other pole of the battery 49, and in this circuit is included an electric bell 52 or other sounding device, as shown in diagram in Fig. 4. The said parts (marked 42 to 52, inclusive) constitute an alarm device for notifying the operator when the supply of cakes has failed for any die, so that he can stop the machine before the molding material can waste through the open or unbacked dies of the mold-plate.

An idle rock-shaft 53 is shown as journaled in the main frame and as provided with a pair of hand-levers 54, one of which has attached thereto a clutch-shifter 55, as best shown in Fig. 1, for throwing the cam-shaft 11 in and out of gear with its driving-pulley 13 for stopping and starting the machine at will. From cross-bar 56 depend stops 57, projecting into the path of the cakes c on the pivoted chute 31 for intercepting and holding the cakes at the heads of the chutes, as will later more fully appear.

Figure 5:
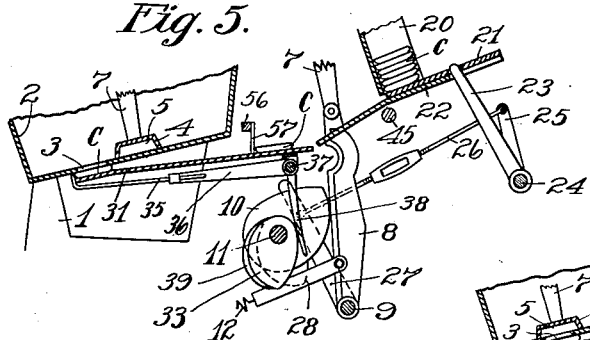
Figure 6:
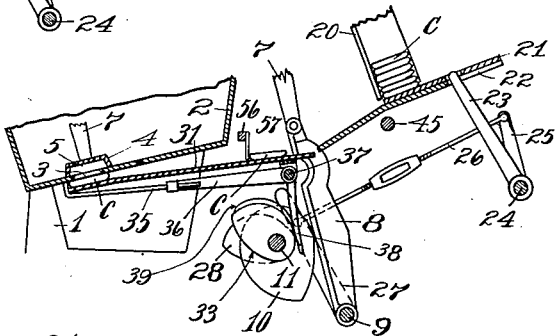
Figure 7:
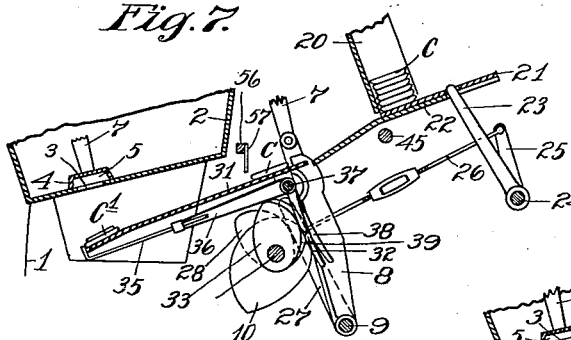
Figure 8:
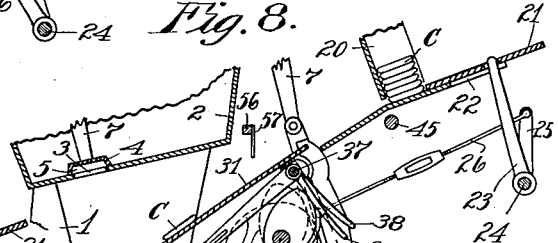
Figure 9:
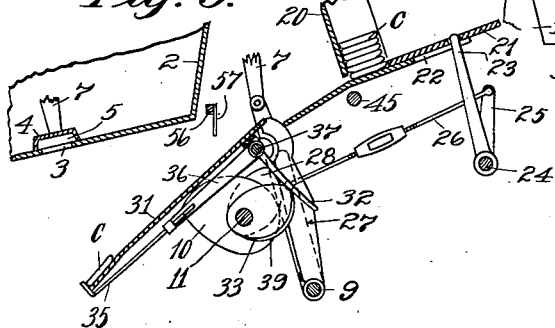

Operation: All the parts of the machine have now been specified, and the actions of more or less thereof may be clear from the detail description. It is thought, however, that it will be serviceable to give a summary of the general operation of the machine, and which may be stated as follows: The machine was primarily designed to apply icing to cakes or other pastries, and this class of molding material may be said to be in a semiplastic condition, as it is in the form of a comparatively thin paste, but one stiff enough to hold its molded form under the action of the dies. Let it be assumed that the stock-hopper 2 has been charged with the said icing or other molding material in proper condition, that the supply-magazines 20 have been properly loaded with cakes c or other pastries to which the icing is to be applied, and, further, that the machine is in motion. The successive actions can then be readily traced from the drawings, especially from the diagram views Figs. 5 to 9, inclusive. Directing attention first to the main view, Fig. 4, and the diagram view Fig. 5, it will be seen that one cake c is being held in its die-centered position and another cake c is being held at the head of the chute by stop 57, that the cut-off valve 4 is in its open position, leaving the die open or uncovered for permitting the icing to pass therein and be molded thereby on the surface of the cake at the die-centered position. It will also be noted that the slide 21 of the force-feed device is in its innermost position, with the column of cakes c in the magazine 20 resting on the top thereof. Figs. 4, 5 may therefore be said to show the parts as they appear when in molding position and can conveniently be taken as the starting-point for tracing the actions. When sufficient time has elapsed for the proper quantity of molding material to have filled the dies upon the exposed surface of the die-centered cakes, the cams 10 will permit the springs 12 to force the cut-off valve 4 into its cut-off or die-closing position, as shown in Fig. 6, thereby cutting off the supply of molding material from the dies and rendering available the air-pressure within the chamber 5 of the cut-off valve to force the molded material out from the dies as soon as the pivoted chutes 31 and the coöperating guard-levers made up of the parts 35 and 36 begin to lower. The cut-off valve then remains in its die-closing position until a new cake is centered under the die. The cams 33, operative on the depending arms 32 of the pivoted chutes 31, are of such form and so set in respect to the cams 39, which operate on the depending arms 38 of the rock-shaft 37, carrying the guard-levers made up of the parts 35 and 36, that the chute and its guard-lever will start to lower together, as shown in Fig. 3, but that soon thereafter a differential movement will begin to be imparted to the guard-lever, so as to move the same in advance of the chute. This differential motion is shown as beginning at or about the time the parts have assumed the position illustrated in Fig. 7. Then under the continued action of the cams the differential motion will increase until the guard-fingers 35 have been pulled entirely away from the chute 31, as shown in Fig. 8 and by the dotted lines in Fig. 4, thus permitting the finished product or frosted cake $c'$ to be delivered under the action of gravity off from the lower end of the chute and over the guide 41 to a receiving-tray 19 on the carrier 18 or other suitable receptacle. During this delivery separation of the pivoted chute and its coöperating guard-lever the cake c which was at the head of the chute when the parts were in the positions shown in Figs. 5, 6, and 7 will be sliding down the chute 31 and would pass off from the chute; but before that can occur the arms 38 of the guard-lever rock-shaft will have passed off from the high points of the cams 39, thereby permitting the opposing springs 40 to come into action and to throw the guard-levers instantly upward into their closed position in respect to the coöperating chutes 31, and thus bringing the projecting tips of the fingers 35 in position to intercept and hold the descending cake c, as clearly shown in Fig. 9, and then under the continued action of the springs 34 and 40 the pivoted chutes and their coöperating guard-levers will be restored to the positions shown in Figs. 4 and 5, and thereby carry the new cake into its die-centered position. During the time that the parts whose actions have been traced move from the positions shown in Fig. 7 to the position shown in Fig. 8 the feed-slide 21 will move from the position shown in Figs. 5, 6, and 7 to the position shown in Figs. 8 and 9, thereby permitting the column of cakes to drop, so as to cause the lower member of the column to be directly in advance of the slide, as shown in Figs. 8 and 9, and later by the time the parts have reassumed the positions shown in Fig. 5 the slides 21 will each have forced out a new cake c into the receiving end of the coöperating chute 31, where it will be intercepted by the depending stop 57, as shown in Figs. 3, 4, 5, and 6, and remain until the next delivery motion begins, as above described.

The foregoing statement traces all the operations with the exception of the action of the alarm device. The cakes c are of course non-conductors. The spring-seated contacts or feelers 43 are so located that the cakes c, intercepted by the depending stops 57 and held thereby at the head ends of the pivoted chutes 31 when the parts are in the position shown in Figs. 3, 4, 5, and 6, will be directly below the said contacts 43 and serve to intercept the same and prevent the contacts from touching the underlying pivoted chutes 31, thereby serving to hold the alarm-circuit open if the feed-supply of cakes is normal or as it should be for all the coöperating dies; but if the supply of cakes should have run out in any of the feed-magazines 20 or if any of the force-feed devices should have failed to work a break or skip in the supply-chain of cakes will thus be produced and there will be no cake to intercept the contact-feeler 43. Hence the feeler will move downward to its limit and make contact with the underlying chute 31, thereby closing the circuit and causing an alarm to be sounded by the bell 52 or other device. This indicates the condition to the operator in time to permit him to stop the machine before the cut-off valve 4 can again be moved into its open position. Hence this alarm device will notify the operator in time for him to stop the machine before any waste of the molding material can take place through the unbacked and uncovered dies, thus not only saving the material, but avoiding the troublesome mess which would otherwise be produced.

By actual usage I have demonstrated the efficiency of the machine herein disclosed for the purposes had in view.

It will of course be understood that modifications can be made in many of the parts without departing from the spirit of the invention.

What I claim, and desire to secure by Letters Patent of the United States, is as follows:

1. In a machine of the class described, the combination with a stock-hopper and a mold or die plate, of a cut-off valve provided with an air-chamber spanning the mouth of the die-plate, when said valve is in a die-closing position, substantially as described.

2. In a machine of the class described, the combination with a stock-hopper and a mold or die plate, of a cut-off valve provided with an air-chamber spanning the mouths of the dies when said valve is in its die-closing position, substantially as described.

3. In a machine of the class described, the combination with a stock-hopper and a mold or die plate, of a cut-off valve and means for rendering air, under pressure, available to force the molded material out of the dies, substantially as described.

4. In a machine of the class described, the combination with a stock-hopper and a mold or die plate, of a cut-off valve which is recessed to afford an air-chamber spanning the dies, when the valve is in its die-closing position, and is provided with connections affording a supply of air, under pressure, to said chamber, for forcing the molded material out of the dies, substantially as described.

5. In a machine of the class described, the combination with a stock-hopper and a mold or die plate, of a pivoted chute and a pivoted guard-lever, coöperating to supply the cakes, one at a time, to the coöperating die, to hold the cake to its die-centered position until the material is molded thereon and to deliver the finished product from the die, substantially as described.

6. In a machine of the class described, the combination with a stock-hopper and a mold or die plate, of a movable chute and a movable guard device, subject to a differential motion in respect to each other, and coöperative to supply the cakes, one at a time, to the dies, hold the cakes in their die-centered position until the material is molded thereon and to deliver the finished product from the dies, substantially as described.

7. In a machine of the class described, the combination with a stock-hopper, a mold or die plate, and a cut-off valve, of a pivoted chute and a pivoted guard-lever provided with centering-fingers adapted to extend above the floor of the chute, which chute and guard-lever coöperate to supply the cakes to the coöperating die, one at a time, to hold the cake in its die-centered position until the material is molded thereon, and to deliver the finished product to receiving-trays or other receptacles, the said chute and guard-lever being subject to a differential movement for separating the same, to effect the delivery, and to bring the same together, immediately thereafter, to catch and hold the next cake and bring the same to its die-centered position, substantially as described.

8. In a machine of the class described, the combination with a stock-hopper, a mold or die plate and a cut-off valve, of a feed-magazine having a forced-feed device for supplying the cakes, one at a time, a pivoted chute and a pivoted guard-lever, coöperating to receive the cakes from said force-feed device, to supply the same, one at a time, to the coöperating die, to hold the cake in its die-centered position, until the material is molded thereon, and to deliver the finished product to receiving-trays or other receptacles, substantially as described.

9. In a machine of the class described, the combination with a stock-hopper having as its bottom a mold or die plate, provided with a series of die-openings, a cut-off valve movable over said plate, forced-feed supply devices, a series of independently-pivoted chutes, subject to independent cams and opposing springs, and a corresponding series of guard-levers, fixed to a common rock-shaft, and subject to a cam and spring, which chutes and guard-levers coöperate to receive the cakes from said forced-feed devices, center the same under the dies, hold the same in their centered position until the material is molded thereon, and to deliver the finished product into receiving-trays or other receptacles, substantially as described.

10. In a machine for molding semiplastic material, such as icing, on cakes or other pastries, the combination with devices for supplying the cakes to the dies, one at a time, in a continuous chain, of an alarm device operative to indicate a skip or break in the supply-chain of cakes, whereby the machine can be stopped before the plastic material can waste through the unbacked or open dies of the mold-plate, substantially as described.

11. In a machine of the class described, the combination with a stock-hopper, mold or die plate, and devices for supplying the cakes to the dies, one at a time, in continuous chains, of an electric alarm device, including a circuit-controller, with yielding contacts normally intercepted by cakes in the supply-chains to hold the circuit open, if the supply is normal, but adapted to close the circuit if any of the intercepting cakes, always present in the normal feed, should be absent, substantially as and for the purpose set forth.

In testimony whereof I affix my signature in presence of two witnesses.

CLARENCE W. CARTER.

Witnesses:
JAS. F. WILLIAMSON,
F. D. MERCHANT.